United States Patent [19]
Storey

[11] Patent Number: 6,011,682
[45] Date of Patent: Jan. 4, 2000

[54] NO-ZAP LOW-COST LIGHTNING PROTECTION

[76] Inventor: Matthew J. Storey, 114 Terrace Garden Ave., Titusville, Fla. 32796

[21] Appl. No.: 09/087,050

[22] Filed: May 29, 1998

[51] Int. Cl.[7] ...................................................... H02H 1/00
[52] U.S. Cl. ............................................................. 361/117
[58] Field of Search .............................. 361/18, 56, 111, 361/117, 91, 118, 119, 91.1

[56]  References Cited

U.S. PATENT DOCUMENTS

| | | | |
|---|---|---|---|
| D. 340,026 | 10/1993 | Slagel | D13/142 |
| D. 356,297 | 3/1995 | Carl | D13/160 |
| 3,626,237 | 12/1971 | Bolton et al. | 313/325 |
| 3,753,117 | 8/1973 | Downing | 325/364 |
| 3,891,919 | 6/1975 | Penninger | 324/72 |
| 4,276,576 | 6/1981 | Uman | 361/1 |
| 4,887,180 | 12/1989 | Climent | 361/91 |
| 5,083,042 | 1/1992 | Merchant | 307/149 |
| 5,168,212 | 12/1992 | Byerley | 324/72 |
| 5,291,208 | 3/1994 | Young | 342/198 |
| 5,453,899 | 9/1995 | Page | 361/1 |
| 5,521,603 | 5/1996 | Young | 342/198 |
| 5,721,659 | 2/1998 | Young | 361/111 |
| 5,768,081 | 6/1998 | Cohen et al. | 361/119 |

*Primary Examiner*—Ronald W. Leja
*Attorney, Agent, or Firm*—Brian S. Steinberger; Law Offices of Brian S. Steinberger

[57] ABSTRACT

Suitable for retail sales or contractor installation, this low-cost, multi-configurable five-part modular system protects sensitive equipment from lightning damage more completely than the limited ability of surge protectors, in homes, boats, offices and industrial applications. A wall outlet connected module can function by itself as a very capable lightning arrestor for 120 VAC power connected equipment. It also can provide protection to surge protectors as well as other modules, if employed. In the other system modules, an AC connected detector control module and three singularly optional accessory modules, permit advance warning, timed interrupt of AC power as well as coaxial or phone line connection control. Reacting to electromagnetic energy bursts up to approximately two miles away, only very local lightning causes system timer operation, avoiding unnecessary shutdown and resetting of equipment. The calibrated trigger range is adjustable down to approximately ½ mile and a manual reset feature allows restoring all equipment operation should a threat quickly pass.

11 Claims, 7 Drawing Sheets

NO-ZAP LOW-COST LIGHTNING PROTECTION

This invention relates to electrical equipment lightning protection system and in particular to low-cost modular devices that protects expensive and sensitive electronics, appliances or industrial electronic equipment from damage due to lightning strikes.

BACKGROUND AND PRIOR ART

Lightning strikes often cause substantial damage to expensive and sensitive electronics, appliances or industrial equipment such as but not limited to home stereos, televisions, computers, video recorders, microwave ovens, security systems, air conditioners and the like. Typical repair bills can run between $80.00 to $200.00 and up per damaged item and take up to several weeks to fix. The power line connections, the antenna input line connections and the phone line connections are a direct electrical line connection to nearby lightning strikes.

Techniques that have been proposed in the past included lightning sensing, then mechanically unplugging the AC plug of electronics equipment from their wall outlet supply source or industrial automatic systems for special applications at a much greater cost.

Having to constantly disconnect and reconnect these connections at the onset and aftermath of each storm is both inconvenient to the user and further impossible when no one is present at the time of the lightning surges, yet no other options are readily available for true lightning protection at an affordable price to the home electronics user.

Typical insurance companies offer little help to most off-the-shelf electronics device repairs, since many insurance policies maintain typically a $250 to $500 deductible. Claims often do not cover replacement cost since older damaged electronics are pro-rated as to their original value. Furthermore, manufacturer and factory warranties on typical electronics devices also do not help, since typical manufacturer warranties exclude lightning damage as a non-covered "act of God" occurrence.

The problems are further compounded since the home electronics market has expanded greatly, microwave ovens, televisions, stereos and video recorders, for example, come with an always "ON" chassis, even when the device is turned "OFF". These constantly "ON" chassis devices are always connected to power lines. This newer type of ON-OFF system is not as resistant to lightning damage from the power lines as the old ON-OFF switched devices which, upon being switched off, left the chassis isolated from the power albeit still connected possibly to antenna signal or phone input. Computer systems are left powered up for convenience and e-mail/Internet access. Larger screen televisions are heavy to move around and the bigger ones, such as projection TV's often incur additional moving charges and high labor charges when taken to the shop for repairs. Strong lightning damage is often unrepairable; a total loss.

Typical off-the shelf surge protectors have also failed to protect against strong lightning energy on the power line. Surge protectors are meant to work with power company surges and spike protection but are not intended to protect from strong lightning. Typical surge protectors are passive unpowered devices that can be damaged by lightning and are non-adjustable to various operating conditions. All disclaim being strong lightning arrestors. The author of this invention, a television repairmnan, was often asked how one could adequately protect expensive electronics, other than unplugging.

Patents have been proposed to overcome lightning type problems. See for example U.S. Patents: Des. 340,026 to Siagel; Des. 356,297 to Carl et al.; U.S. Pat. No. 3,753,117 to Downing; U.S. Pat. No. 3,891,919 to Penninger; U.S. Pat. No. 4,276,576 to Uman et al.; U.S. Pat. No. 4,887,180 to Climent et al.; U.S. Pat. No. 5,083,042 to Merchant; U.S. Pat. No. 5,168,212 to Byerley III et al.; and U.S. Pat. No. 5,521,603 to Young. However, none of the prior art adequately provides for protecting electronic devices completely, conveniently, and inexpensively from lightning strikes, nor offers a modular, building-block approach for adapting to particular needs.

SUMMARY OF THE INVENTION

The overall intent of the present invention is to provide a low-cost, modular approach for various levels and needs of home, boat, office or business lightning protection. Five basic modules are described herein. Firstly, a wall outlet mounted module which can function as a true lightning arrestor for nearby equipment and can function as a stand-alone device where only non interrupted power line protection is desired, at lowest cost, or in conjunction with other modules. The other modules offer timed interrupt power line, antenna line, phone line, and remote device protection, comprising four additional modules. Of these four modules, one is a detector/timer/control unit which provides control for three accessory cut-off modules for antenna line, phone, or remote power.

The first objective is to provide a fuse-protected, spark gap, lightning arrestor protector outlet module. The module has the lowest cost of all the modules, approximately $20.00 in cost. This AC outlet connected passive, module uses a unique dual-rod spark gap acting as a crow bar short within the 10 amp fused device. Once the spark gap fires at approximately 600 to 800 VAC, the fuse quickly blows, isolating the gap and equipment connected. During the arc across the gap, the energy is shifted to neutral and ground.

The second objective is to provide a fail safe detector/timer/control module utilizing a unique, low cost, five transistor, one integrated circuit design able to fit on a 2 & ½" square printed circuit board. It features a variable ½ to 2 mile sense range, an approximately 12" antenna, a 15 minute resettable disconnect timer, a status indicator light, power supply, 7 amp switching to connected equipment, and accessory module control outlet, in a less than 50 cubic inch metal housing, priced under $65.

The third objective is to provide a coaxial antenna line accessory module, in a shielded metal housing, able to ground the inner and outer conductors of coax line leading to the protected TV, VCR, or satellite receiver, priced under $25.

The fourth objective is to provide a phone line accessory module, in a plastic housing, able to ground the four wires leading to the phone, fax, modem, answering machine, priced under $25.

The fifth objective is to provide a remote power accessory module, able to switch off up to 15 amps of 110 VAC power leading to contactors for well pumps, roof air conditioners, and other industrial equipment, as examples, priced under $40.

Further objectives and advantages of this invention will be apparent from the following detailed descriptions of presently preferred embodiments, which are illustrated schematically and diagrammatic ally in the accompanying drawings.

BRIEF DESCRIPTION OF THE FIGURES

FIG. 1 shows the arrestor protector module in a stand alone configuration, offering low cost non-interrupted lightning energy protection to connected equipment.

FIG. 2 shows the arrestor protector module upstream of an existing surge protector strip, permitting non interrupted protection from lightning energy for connected equipment as well as the surge protector. Combining these two items makes sense in that, prior to the firing of the spark gap module, the surge protector is able to safely dissipate surge energy to connected equipment. The energy is limited in magnitude and time by the spark gap module action. The limited energy absorption of surge protectors is thereby protected.

FIG. 3 shows the detector/timer/control module in a stand-alone configuration, offering nearby lightning triggered timed interrupt of AC power and coaxial or phone line protection when accessory modules are connected (not shown).

FIG. 4 shows the detector/timer/control module upstream of an existing surge protector strip, permitting timed interrupt protection of AC power to connected equipment as well as the surge protector, and control of coaxial and phone modules.

FIG. 5 shows the arrestor protector module in a protective configuration for the detector/timer/control module and connected equipment, increasing the control units ability to function during and after a heavy lightning surge. Note that the detector/timer/control unit also has fail-safe design protection to connected equipment.

FIG. 6 shows a complete set up for optimal lightning protection to sensitive equipment, including phone line and coaxial line control, with advance warning timed interrupt.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
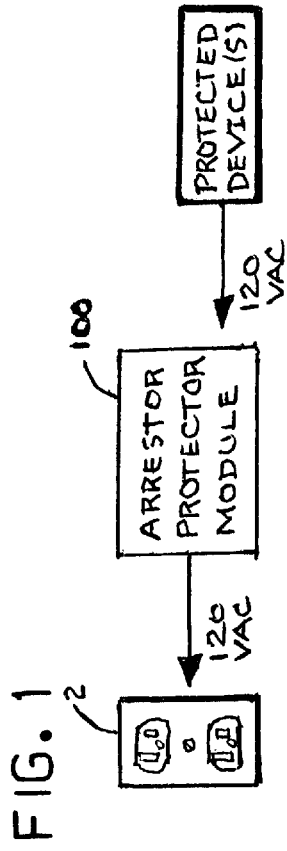
FIGS. 1 through 6 depict the various configurations possible for varying applications, cost, and levels of protection. For clarity, connected AC equipment and the various accessory modules, connected to the detector/timer/control module, are not shown.
Figure 2:
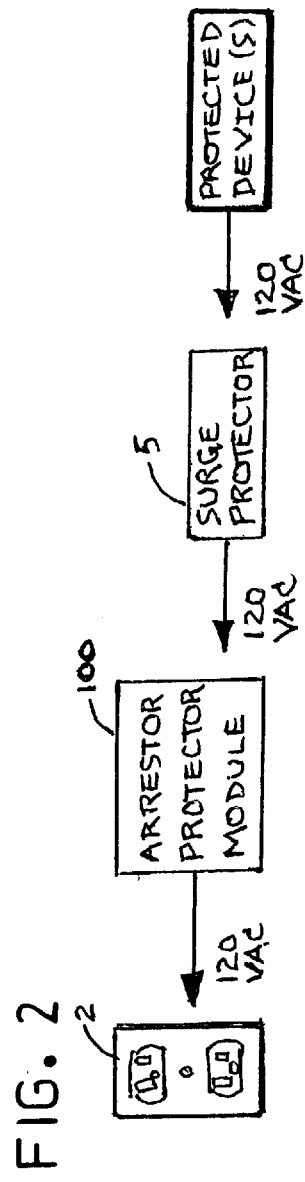

FIGS. 1 through 6 depict the various configurations possible for various applications, system cost, and levels of protection. FIGS. 1 and 2 offer non-interrupted use of protected equipment at lowest cost, but do not allow protection for phone line, coaxial line, or power switching capability as shown in FIGS. 3, 4, 5 and 6. Not shown are connected AC equipment and optional accessory modules connected to the detector/timer/control module as these will vary according to the application. FIGS. 1–6 will now be described, as well as the additional FIGS. 7 through 12, thereafter.

FIG. 1 shows a preferred use 10 of the non-interrupting lightning arrestor protector module 100 in a stand alone configuration, offering low cost lightning energy protection to connected devices. Referring to FIG. 1, the arrestor protector module 100, described in more detail in reference to FIGS. 7A, 7B, and 8, can be connected to a typical 120 volt AC wall plug outlet 2, so that equipment to be protected can be plugged into the arrestor protector module 100. Such equipment can be any 120 VAC device susceptible to damage by surges over 600 to 800 VAC for over a few milliseconds. It is over this magnitude and time where most electronics or appliances can be damaged significantly. The normally non-interrupting power supplied by this protection module precludes the inconvenience of resetting programmed menus or internal clocks in protected equipment.

FIG. 2 shows another preferred use 20 of the arrestor protector module 100 upstream of an existing surge protector strip 5, permitting non interrupting protection from lightning energy for connected devices, as well as, the surge protector. The limited energy absorption of surge protectors makes them vulnerable to lightning damage. Referring to FIG. 2, the arrestor protector module 100, described in more detail in reference to FIGS. 7A, 7B, and 8, can be connected to a typical 120 volt AC wall plug outlet 2, followed by a typical off-the-shelf surge protector strip 5 with receptacles which can receive AC plugs of equipment to be protected.

Figure 3:
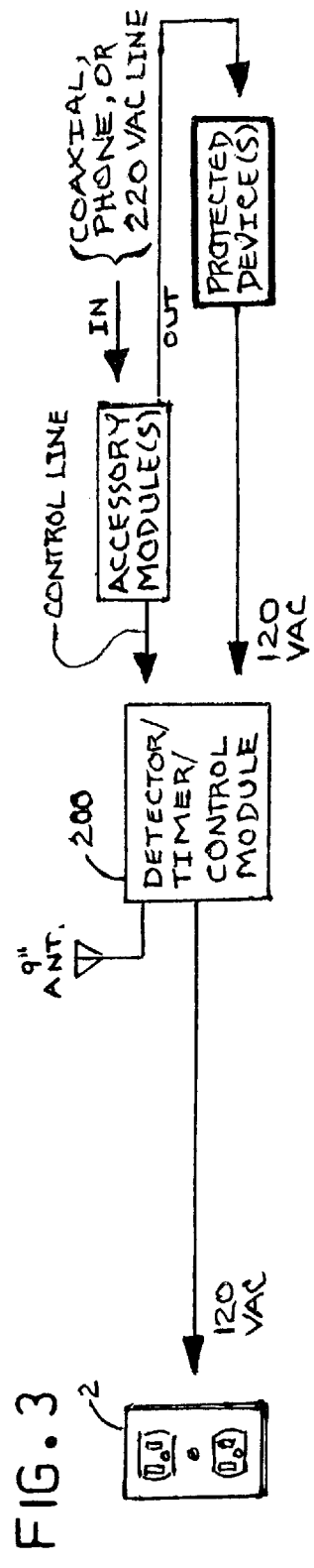
Figure 10:
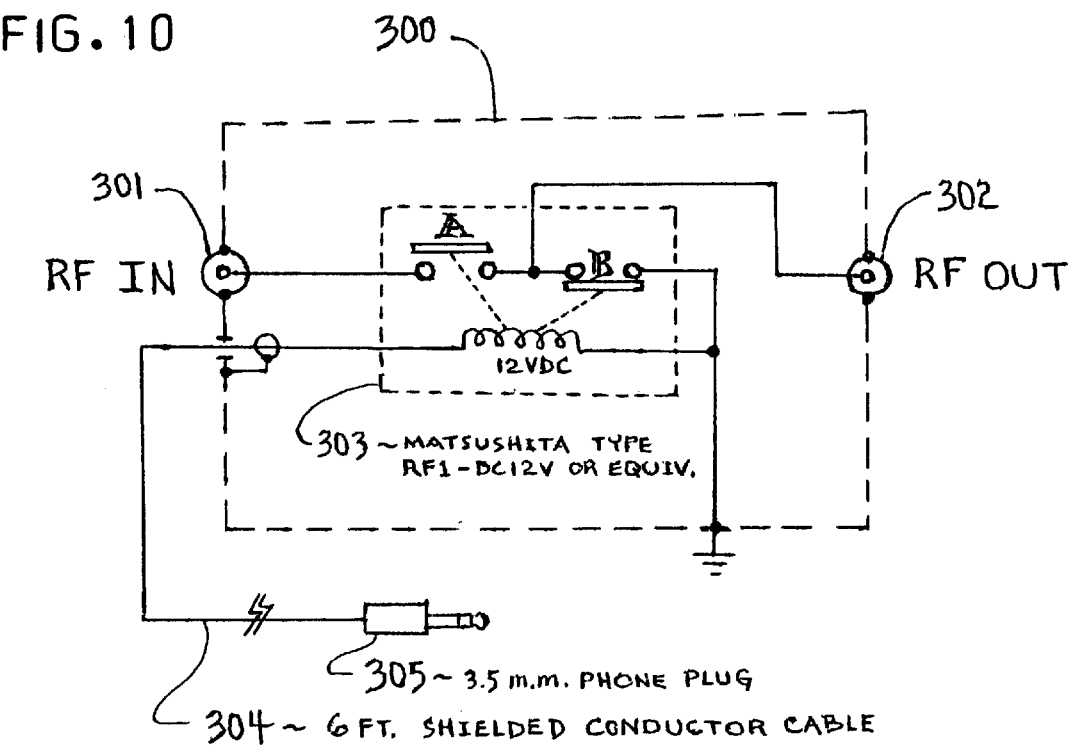
FIG. 10 shows the schematic for the coaxial accessory module in a shielded housing, with a shielded control line for minimal susceptibility to unwanted interference. Uses can include cable TV and satellite TV input lines.
Figure 11:
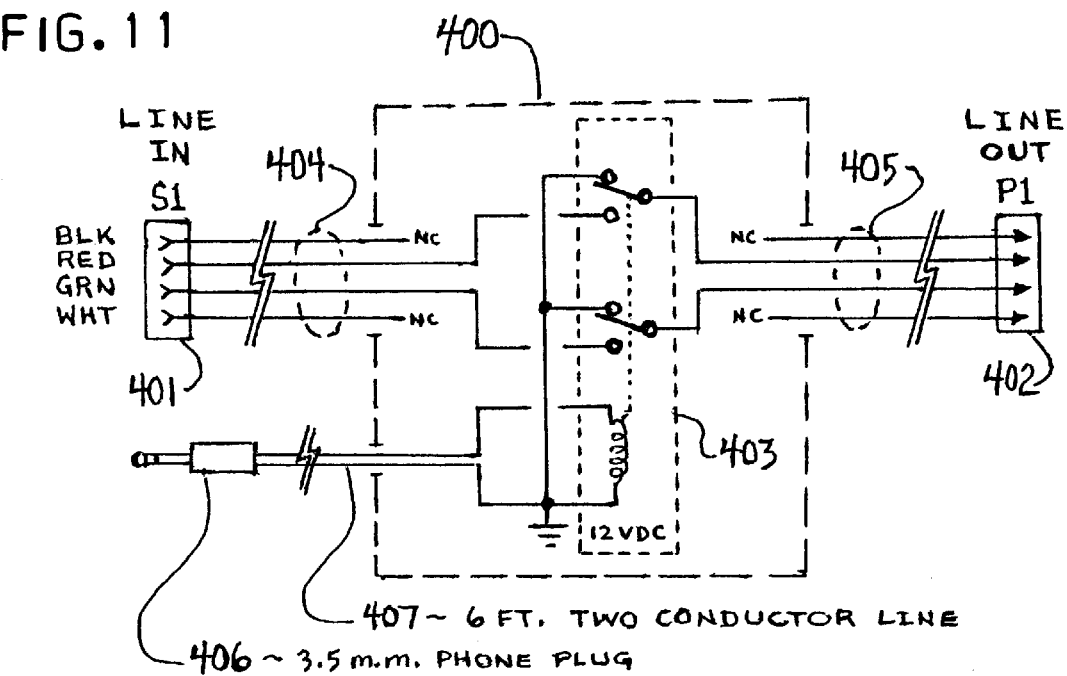
FIG. 11 shows the schematic for the phone line accessory module for typical 4 wire phone lines. Uses can include computer, modem, fax, phone and answering machine protection.
Figure 12:
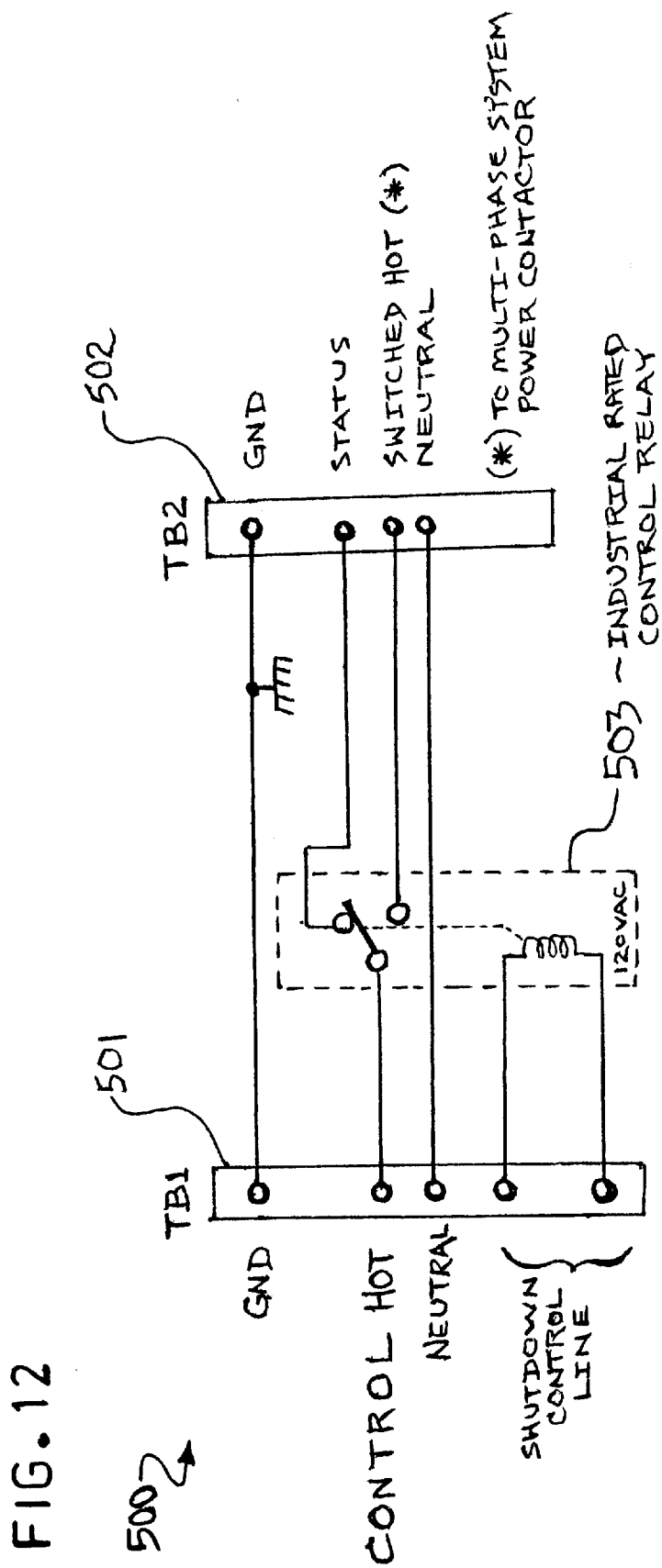
FIG. 12 shows the schematic for the power relay accessory module for industrial or high power switching applications, such as 220 VAC power contactor control. Up to 15 amps inductive can be switched and a status output is available to indicate module action at a remote panel.

FIG. 3 shows a preferred use 30 of the detector/timer/control module 200 in a stand alone configuration, offering nearby lightning triggered timed interrupt of AC power and coaxial or phone line protection when accessory modules 300, 400 or 500 are connected, shown in FIGS. 10, 11 and 12 respectively.

Figure 9:
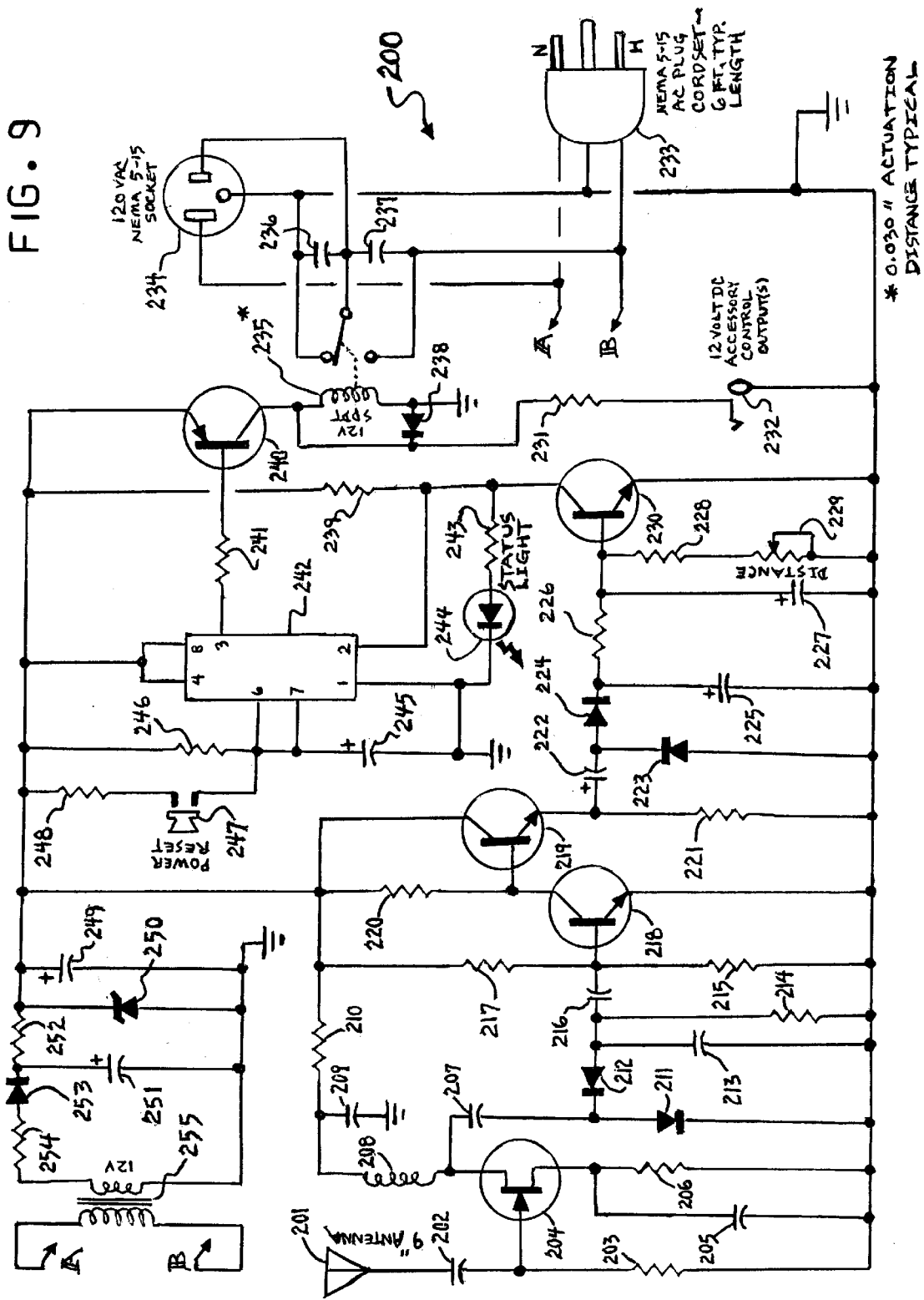
FIG. 9 is a schematic of the detector/timer/control module, having a five transistor, one integrated circuit capable of reacting to lightning approximately ½ to approximately 2 miles away, utilizing a 12" antenna It features a resettable 15-minute timer circuit, distance or sensitivity control, and 120 VAC or 12 VDC controlled outputs. Up to 7 amps inductive can be switched and up to two accessory modules powered. A rugged power supply and status indicator light is also included.

Referring to FIG. 3, detector/timer/control module 200, described in detail in reference to FIG. 9, is plugged directly into wall outlet 2. Various accessory modules, 300, 400, or 500 (shown in FIGS. 10–12) can be connected to module 200, according to application. The ½ to 2 mile range of this module was carefully selected to ignore activity beyond the immediate area, avoiding inconvenient and unnecessary shutdowns.

Figure 4:
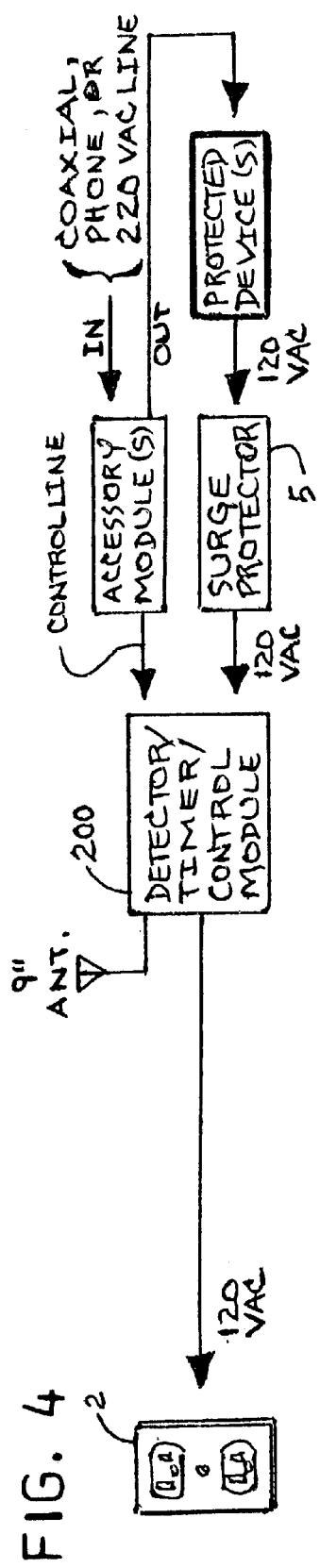

FIG. 4 shows another preferred use 40 of the detector/timer/control module 200 upstream of an existing surge protector strip 5, permitting timed interrupt protection of AC power to connected devices, as well as, the surge protector 5, and control of accessory modules 300–500, shown in FIGS. 10–12.

Figure 5:
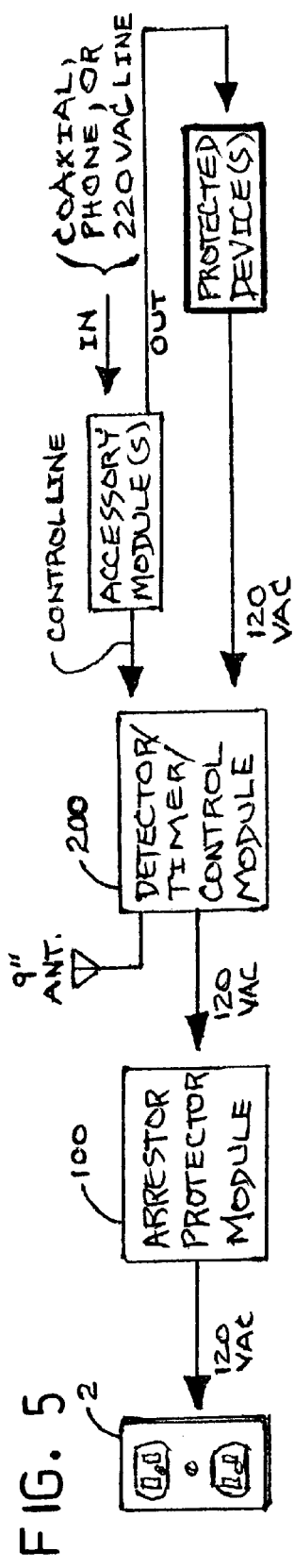

FIG. 5 shows another preferred use 50 of the arrestor protector module 100 in a protective configuration for the detector/timer/control module 200 and connected equipment, increasing the control units ability to function during and after a heavy lightning surge. Note that the detector/timer/control unit 200 also has fail safe protection, discussed in the FIG. 9 description.

Figure 6:
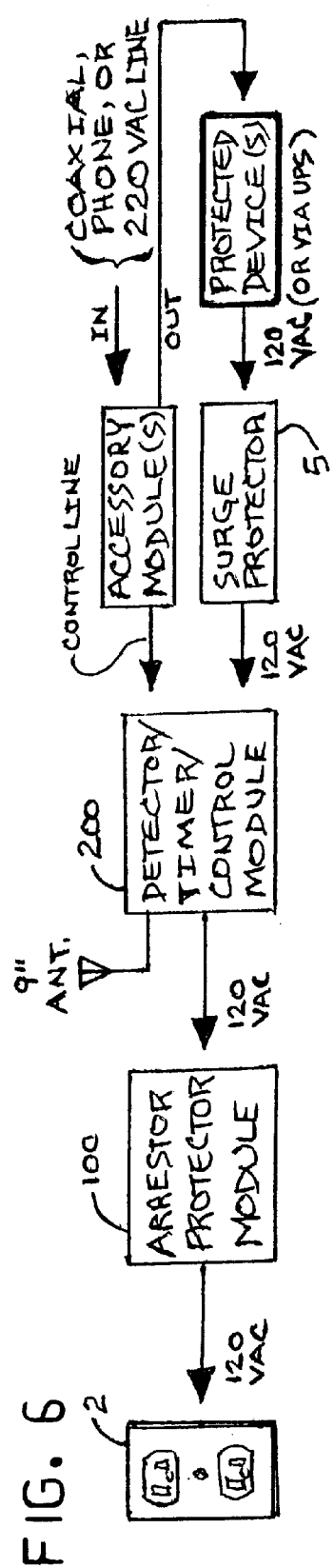

FIG. 6 shows another preferred use 60 of a complete set up for optimal lightning protection to sensitive devices, including phone line and coaxial line control, with advance warning timed interrupt.

Referring to FIG. 6, surge protector outlet strip 5 plugs into detector/timer/control module 200 which plugs into arrestor protector 100 the latter of which directly plugs into wall outlet 2. Various modules 300, 400 and 400 connect directly to module 200, according to application.

Figures 7A, 7B:
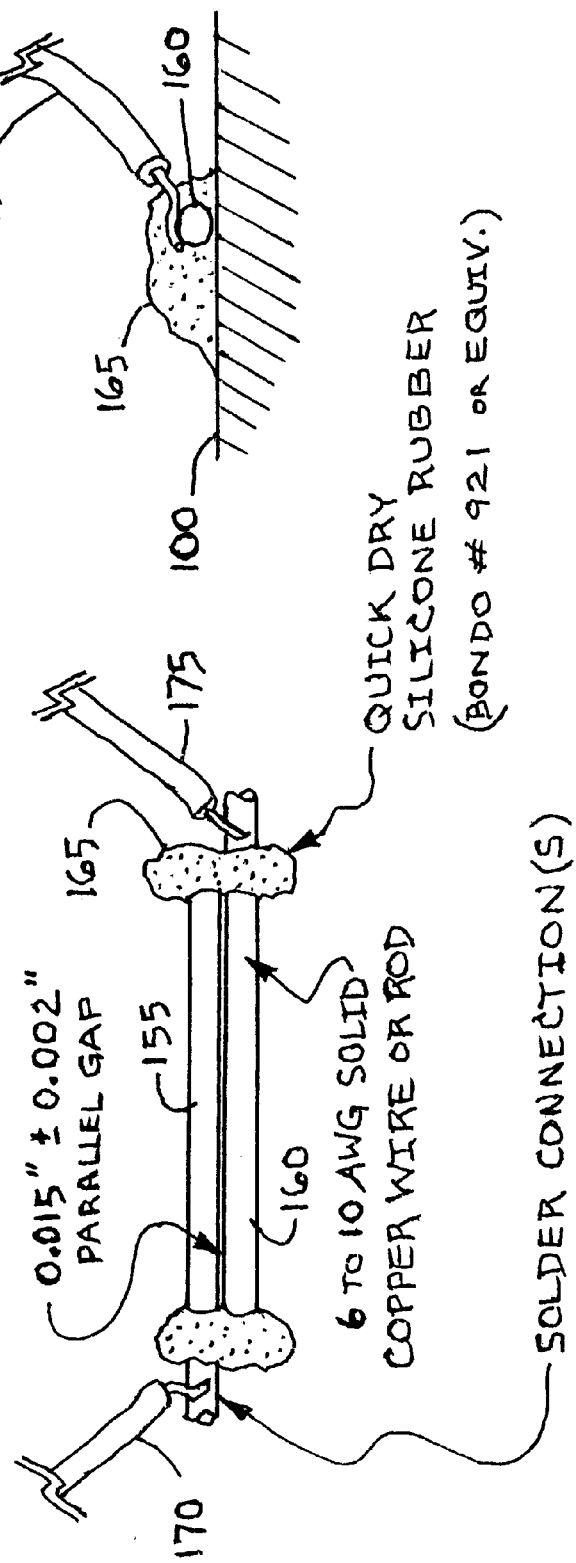
FIG. 7A shows the detail views of the dual rod spark gap and its basic construction and dimensions.
FIG. 7B shows an end view of dual-rod spark gap of FIG. 7A along arrow A. Wires can terminate at each end or both at one end depending on wiring convenience.
Figure 8:
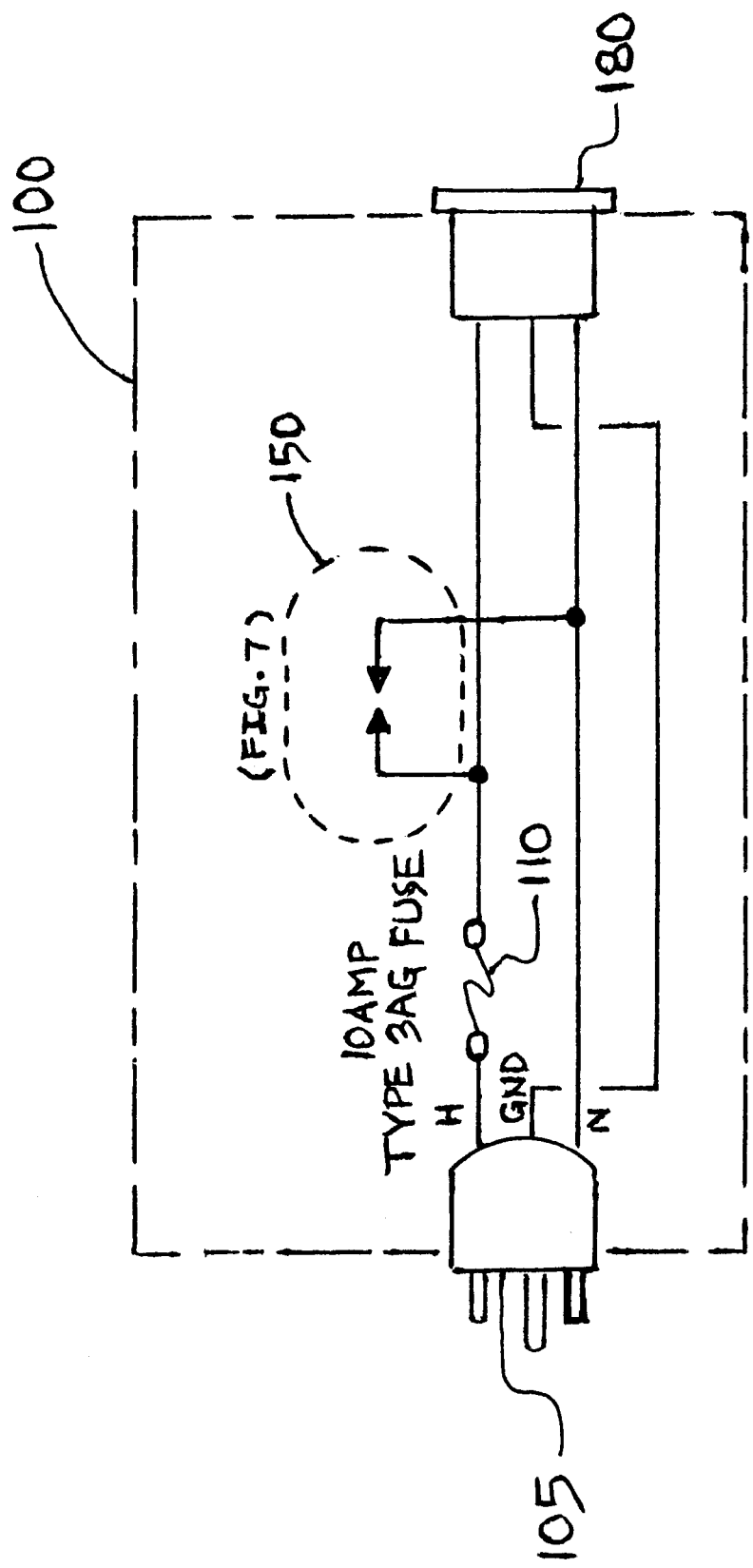
FIG. 8 shows a schematic of the spark gap arrestor protector module in a simplified embodiment. A line cord and multiple outlets are further options.

FIGS. 7A, 7B and 8 show the components of the fuse protected spark gap arrestor protector module 100 in a typical plastic housing. In FIG. 8 plug 105 can be a NEMA type 5-15 plug with three prongs: AC hot, ground and AC neutral. Similarly, receptacle 180 is also a NEMA 5-15 type.

The AC neutral 140 and ground 130 each connects between plug 105 and receptacle 180. The AC hot 120 from plug 105 connects to fuse 110, Type 3AG, fast blow, 10 amp, 250 volt rated, and passes on to receptacle 180 AC hot terminal. The spark gap 150 connects via wire 170, 175 to the receptacle AC hot 120 and AC neutral 140, protecting connected equipment, even if equipment has a 2-wire cord set.

FIGS. 7A and 7B show a typical construction of the dual-rod 155, 160 spark gap employing quick-dry silicone rubber staking compound 165. Other mounting methods are feasible, provided the parallel rod gap is maintained at 0.015" and 0.002", which ionizes and arcs in the proper 600 to 800 VAC range.

Each of the rod materials 155, 160 is a solderable copper, 6 to 10 AWG wire size, 2" to 3" length, providing many areas for an arc and copper vaporization to occur. The smooth, round rods 155, 160 allow for a close electrode spacing, there are no sharp points to trigger varying ionization voltages or potential fields, thus a more consistent, controlled arc voltage.

Referring to FIGS. 7A, 7B and 8, the spark gap 150 is insulated by air for normal 120 VAC line voltages and spikes. Within milliseconds above 600 VAC the air ionizes the 0.015" gap sufficiently to cause a voltage crowbar arc discharge of line voltage and lightning energy, quickly blowing the 10 amp, type 3AG, fast blow fuse, isolating all connected equipment. Fuse 110 also limits the arc energy to roughly 2000 to 5000 watt seconds which prevents deterioration of the gap over repeated firings. The fuse 110 also provides double redundancy coupled with the line circuit breaker, assuring a UL approvable circuit of proper design safety. Thus, the gap module 100 is a passive device which only functions at the instant of an actual potentially damaging line voltage lightning induced surge. Electronic equipment that can benefit by this normally uninterrupted protection can include programmed menu devices, devices with clocks, and the like. While effective, at low cost, this passive module cannot control or protect other than power line borne lightning energy.

FIG. 9 shows the active detector/timer/control module 200 schematic. All components will be identified followed by a description of how the module 200 functions. Component 201 can be a 12" length, 18 gauge, PVC coated, stranded wire antenna. 202 refers to a 0.01 mf, 50 volt ceramic capacitor. 203 refers to a 4.7 K ohm, ¼ Watt film resistor. 204 refers to a MPF102, field effect transistor. 205 refers to a 0.01 $\mu$f, 50 volt ceramic capacitor. 206 refers to a 470 ohm, ¼ Watt film resistor. 207 refers to a 0.01 82 f, 50 volt ceramic capacitor. 208 refers to a 2.2 milli Henry RF choke. 209 refers to a 0.01 $\mu$f, 50 volt ceramic capacitor. 210 refers to a 470 ohm, ¼ Watt film resistor. 211 and 212 each refer to a 1N4148, silicon signal diode. 213 refers to a 0.01 $\mu$f, 50 volt ceramic capacitor. 214 and 215 each refers to a 39 k ohm, ¼ Watt film resistor. 216 refers to a 0.1 $\mu$f, 50 volt ceramic capacitor. 217 refers to a 680 K ohm, ¼ Watt film resistor. 218 and 219 each refers to a 2N4401, silicon transistor (NPN). 220 refers to a 10 K ohm, ¼ Watt film resistor. 221 refers to a 4.7 K ohm, ¼ Watt film resistor. 222 refers to a 4.7 $\mu$f, 50 volt DC electrolytic capacitor. 223 and 224 each refer to a 1N4148, silicon signal diode. 225 refers to a 4.7 $\mu$f, 50 volt DC electrolytic capacitor. 226 refers to a 39 K ohm, ¼ Watt film resistor. 227 refers to a 22 $\mu$f, 50 volt DC electrolytic capacitor. 228 refers to a 4.7 K ohm, ¼ Watt film resistor. 229 refers to a 50 K ohm, linear taper potentiometer. 230 refers to a 2N4401, silicon transistor (NPN). 231 refers to a 47 ohm, 2 Watt, metal oxide resistor. 232 refers to a 3.5 mm, phone jack, mono. 233 refers to approximately 6 to approximately 8 feet, of 3 wire, 18 AWG, line cord. 234 refers to NEMA 5-15, 3 wire AC socket. 235 refers to a 12 VDC, SPDT contact, 10 amp resistive, relay. 236 and 237 each refers to 0.01 $\mu$f, 1 KV ceramic capacitor. 238 refers to a 1N4007, silicon power diode. 239 refers to a 2.2 ohm, ¼ Watt film resistor. 240 refers to a 2N4403, silicon transistor (PNP). 241 refers to a 18 K ohm, ¼ Watt film resistor. 242 refers to an LM555CN or NE555N, 8 pin timer integrated circuit. 243 refers to a 2.2 K ohm, ¼ watt film resistor. 244 refers to a T-1¾ red diffusal lens light emitting diode. 245 refers to a 1000 $\mu$f, 25 VDC electrolytic capacitor. 246 refers to a 680 K ohm, ¼ watt, film resistor. 247 refers to a normally open, momentary push button. 248 refers to a 470 ohm, ¼ Watt film resistor. 249 refers to a 22 $\mu$f, 50 VDC, electrolytic capacitor. 250 refers to a 1N5352, 12 VDC, 5 Watt, zener diode. 251 refers to a 1000 $\mu$f, 25 VDC, electrolytic capacitor. 252 refers to a 39 ohm, 2 Watt, metal oxide resistor. 253 refers to a 1N4007, silicon power diode. 254 refers to a 1.0 ohm, 2 Watt, metal oxide resistor. 255 refers to a 12.6 VAC, 300 milliamp, power transformer.

Referring to FIG. 9, the 12" antenna 201 and capacitor 202 couple lightning induced energy from over 20 miles away to the voltage sensitive field effect transistor 204. Resistor 203 sets a low impedance input to desensitize the untuned first stage radio frequency amplifier 204 from background, non-lightning energy. Resistor 205 and capacitor 206 set the first stage DC bias and frequency response. RF choke 208 centers the broad untuned gain in the approximately 0.5 to approximately 2 MHz RF spectrum. Capacitor 209 and resistor 210 form a RF decoupling network to the power supply section.

Referring to FIG. 9, capacitor 207 couples RF signal to the AM detection diodes 211 and 212. The forward conduction resistance of diode 212, capacitor 213, and resistor 214 form an RC network to center the detector response around approximately 500 Hz to approximately 5000 Hz. Capacitor 206 and 213 also attenuate household 60 Hz noises.

Referring to FIG. 9, capacitor 216 couples the negative going audio spectrum energy pulses to second stage transistor 218, an inverting high impedance AC amplifier with proper DC bias set by resistors 215 and 217. Resistor 220 sets up the stage gain. The high impedance input of transistor 218 assures the AM detector is not loaded down, maintaining circuit overall gain. Positive going pulses appear at transistor 218 collector.

Referring to FIG. 9, third stage transistor 219 is an emitter follower, not loading transistor 218 collector by its high input impedance, and able to drive the next stage by its low output impedance formed by resistor 221. Capacitor 222 couples frequencies down to below several hundred Hertz to AC rectifier diodes 223 and 224. The rectified AC is filtered by capacitor 225 lightly to allow varying DC levels that follow the lightning pulse signal to full amplitude which can reach 8 to 10 volts DC during a strong nearby lightning strike.

Referring to FIG. 9, resistor 226 and capacitor 227 form another RC network which responds weakly to less than 0.1 second noise spikes, but allows 0.1 to 0.5 second DC lightning pulses to reach transistor 230. Resistor 226, 228, and the variable resistor 229, "DISTANCE", control form a ladder network to feed fourth stage transistor 230 with proper lightning trigger levels, from roughly ½ to approximately 2 miles away, and adjust for varying gain in the preceding stages from variations in components from module to module. For the distance control, clockwise is toward the maximum range of 2 miles and counter clockwise is toward the less sensitive ½ mile range, idealized for reaction to the most local storm threats, while ignoring distant storms. This prevents unnecessary equipment interruption and/or reset. The DC trigger level thus varies from 3 to 10 VDC across capacitor 255.

Referring to FIG. 9, upon sufficient DC level, fourth stage transistor 230 pulls pin 2 of the integrated circuit type 555 timer to ground, initiating a 15 minute time cycle. Resistor 239 is a pull up resistor. Resistor 246 and capacitor 245 set the 15 minute time cycle. As a convenience, resistor 246 and the power reset momentary push button 247 quickly recharges capacitor 245 to reset the timer 242 and return the module 200 to its watchdog state. Resistor 243 and LED 244 form a status indicator light whereby, LED 244 is normally on and blinks off during strong nearby lightning.

Prior to trigger, the IC outputs a negligible voltage at pin 3, near ground, which through resistor 241 keeps the buffer/inverter fifth stage transistor 240 biased on. After trigger at pin 2, a voltage near the power supply level appears on pin 3. This turns off transistor 240 base-emitter junction and the relay 235 is no longer fed with current from 240 collector, thus, inactivated, during the timed cycle.

Referring to FIG. 9, when relay 235 is inactivated by timer initiation or power outage, power no longer is supplied to AC socket 234, which now has a grounded output rather than the normal 120 VAC. During this time, the accessory jack 232 no longer has a 12 VDC output due to transistor 240 being in the off state. Fuse resistor 231 provides overloading and short circuit protection to transistor 240. Rectifier 238 protects transistor 240 from a relay induced inductive kickback. Capacitors 236 and 237 absorb inductive surges and arcing during relay 235 make or break action.

Referring to FIG. 9, plug 233 is a 3 wire AC cord set able to be plugged into a nearby wall outlet. In the 12 VAC power supply section the power transformer 255 charges filter capacitor 251 through the current-limiting fuse resistor 254 and rectifier 253. The fuse resistor 252 and power zener diode 250 form a regulator and over voltage protection circuit. Filter capacitor 249 keeps the power supply output impedance low. The use of current limiting metal fuse resistors and overvoltage clamping helps the reliability of the overall circuit in a high surge lightning scenario. However, if the power supply fails, or power goes out in the area, the unit reacts by going into a fail-safe mode whereby the relay 235 is deactivated as if in the timed mode. Upon power restoration, or initial plug in to AC line power, the unit restores power to attached equipment, with no reset required.

As FIGS. 5 and 6 show, ability to withstand severe lightning surges is further enhanced by the use of the fuse protected spark gap lightning arrestor protector module. Every effort has been made to keep parts count and costs to a minimum without sacrificing overall performance of the detector/timer/control module.

FIG. 10 is a schematic 300 showing the coaxial accessory module in a shielded housing, with a shielded control line for minimal susceptibility to unwanted interference. Uses can include cable TV and satellite TV input lines protection for video recorders, televisions, and satellite receivers. The module is constructed of a small soldered lid, deep drawn plated steel case, Input and Output connections are via type "F" panel mount coaxial connectors. The relay 303, a 12 VDC, SPDT relay, is positioned to keep wires as short as possible. The control line cable 304, single conductor shielded, feeds through a small hole with shield soldered around the hole inside, and is insulated by Teflon. Approximately 6 feet of cable runs to a 3.5 mm. Phone plug 305 which can plug into the main module 200. The relay 303 is normally energized, letting signal pass through, until power is removed, whereby the output is shorted to ground. The output connector 302 feeds to the protected equipment and offers minimal stray interference in the energized state, at up to 1000 MHz.

FIG. 11 is a schematic 400 showing the phone line accessory module for typical 4 wire phone lines. Uses can include computer, modem, fax, phone and answering machine protection. The module is constructed of a plastic mini-box 400. Modular phone connectors, socket 402 and plug 401 are attached to 6' phone lines 405, 404 and enter through the mini-box whereby termination's are made on the relay 403. Component 403 relay is a 4 PDT, 12 VDC type. 6 feet of dual wire, 20 AWG cord attached to the relay coil 403 on one end and phone plug 406 on the other, able to plug into main module 200. The relay 403 is normally energized, letting phone signals through, until power is removed, whereby the output is shorted to ground. Connector 401 fees to the protected equipment.

FIG. 12 is a schematic 500 for the power relay accessory module for industrial or high power switching applications, such as 220 VAC power contactor control. Up to 15 amps inductive can be switched and a status output is available to indicate module action at a remote panel.

The module is constructed of a metal enclosure 500, NEMA indoor or outdoor types, as examples. Terminal blocks 501 and 502 are mounted inside with relay 503. Power input is normally passed through to the output 502 block, with relay 503 normally energized. With control power removed relay 503 changes state at which time the output block HOT is deactivated and the status line becomes activated with a 120 VAC signal, suitable for remote indication of system operation. The 120 VAC control line plugs into main module 200 via plug 504.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A low cost, flexible, modular system for protecting both operating and nonoperating electronic equipment, appliances, and industrial equipment from lightning energy damage without using metal oxide varistors (MOVs), comprising:

a power limited arrestor protector module for providing protection to 120 VAC power line connected equipment from 120 VAC power line surges caused by lightning utilizing a fuse protected spark gap, the fuse protected spark gap of the power limited arrestor module having parallel rods forming a spark gap capable of discharging the lightning within approximately a first millisecond via an arc between and along the parallel rods in the range of approximately 600 to approximately 800 VAC, and a separate 10 amp fuse connected to the parallel rods, wherein the ten amp fuse will disconnect power to the 120 VAC power line connected equipment within approximately a second millisecond of the arc, to prevent deterioration of the gap over repeated firings;

a coaxial antenna line accessory module for providing protection to coaxial cable connected devices affected by the lightning;

a phone line accessory module for providing protection to a telephone line connected device affected by the lightning; and a power relay accessory module for providing power interrupt control to remote AC power equipment affected by the lightning; and a main detector-control module for providing an automatic time shutdown for the 120 VAC power line connected equipment affected by the lightning, and for providing an automatic timed shutdown for at least one of the coaxial antenna accessory module, the phone line accessory module and the power relay accessory module, wherein the system protects against lightning energy damage while the connected equipment and the devices are both operating and nonoperating, without using metal oxide varistors (MOVs).

2. The low cost flexible, modular system of claim 1, wherein the parallel rods spark gap includes:

approximately 2 to approximately 3 inch long copper rods spaced apart from one another approximately 0.015 inches, wherein the parallel rods provide for repeated discharges and copper vaporization without complete burn-through due to the ten amp fuse, and thermo-dissipation of the copper rods.

3. The low cost, flexible, modular system of claim 1, wherein the main detector module further includes:

an antenna of less than approximately 9 inches in length;

means for detecting the lightning from the antenna;

a calibrated variable sense means for adjusting the detection distance of the lightning, the sense means having a range of approximately ½ to approximately 2 miles;

a dual purpose power on and lightning indicator light for determining operating status of the main detector module;

first means to interrupt AC power to the 120 VAC power line connected equipment; and second means to interrupt power to the at least one accessory module.

4. The low cost, flexible, modular system of claim 1, wherein the main detector module further includes:

a first stage means having a voltage sensitive broad-tuned RF amplifier with a response centered at approximately 0.5 MHz to approximately 3.5 MHz;

a second stage means connected to the first stage means, the second stage means having an AM detector with a response from approximately a hundred Hz to approximately 5 KHz;

a third stage means connected to the second stage means, the third stage means having an AC coupled amplifier with high input impedance and low output impedance;

a fourth stage means connected to the third stage means, the fourth stage means having a delayed response DC detector and trigger stage sensitive to relatively long lightning pulses;

a fifth stage means connected to the fourth stage means, the fifth stage means having an approximately 15 minute triggered one-shot timer;

a sixth stage means connected to the fifth stage means, the sixth stage means having an inverting relay driver for the at least one accessory module and for a next stage power relay;

a seventh stage means connected to the sixth stage means, the seventh stage means having an AC power control relay and AC receptacle;

an eighth stage means connected to the first, the second, the third, the fourth, the fifth, the sixth, and the seventh stage means, the eighth stage means supplying DC power with zener diode overvoltage clamping and fuse resistor over-current protection.

5. The low cost, flexible, modular system of claim 1, further comprising:

a surge protector device connected between the arrestor protector module and the 120 VAC power line connected equipment, such that the surge protector device is not damage by the lightning, and for allowing additional equipment protection from the lightning.

6. The low cost, flexible, modular system of claim 1, wherein the main detector control module is connected between the arrestor protector module and the power line connected equipment for protection of the main detector module, and main power switching relay contacts.

7. The low cost, flexible, modular system of claim 1, wherein the main detector control module includes:

a fail-safe means having an unenergized relay as a protect state ensuring protection when the 120 VAC power is interrupted by power failure and the lightning.

8. A low cost lightning protection system for protecting operating and nonoperating electrical equipment from lightning energy damage, without using metal oxide varistors (MOVs), comprising:

a separate power limited arrestor protector module for providing protection to 120 VAC power line connected equipment from 120 VAC power line surges caused by lightning utilizing a fuse protected spark gap, the fuse protected spark gap having parallel rods forming a spark gap capable of discharging the lightning within approximately a first millisecond via an arc between and along the parallel rods in the range of approximately 600 to approximately 800 VAC, each of the parallel rods being approximately 2 to approximately 3 inches long copper rods spaced apart from one another approximately 0.015 inches, and a separate 10 amp fuse connected to the parallel rods, wherein the ten amp fuse will disconnect power to the 120 VAC power line connected equipment within approximately a second millisecond of the arc, to prevent deterioration of the gap over repeated firings, wherein the parallel rods provide for repeated discharges and copper vaporization without complete burn-through due to the ten amp fuse, and thermo-dissipation of the copper rods the separate arrestor protector module being adaptable to home, office, boat and industry applications, wherein operating and nonoperating the power line connected electrical equipment are protected from lightning without using metal oxide varistors (MOVs).

9. The low cost lightning protection system of claim 8, wherein the system further includes:

a main detetector-control module for providing an automatic timed shutdown for the 120 VAC power line connected equipment affected by the lightning, and for providing an automatic timed shutdown for at least one of an coaxial antenna accessory module, a phone line accessory module and a power relay accessory module.

10. The low cost lightning protection system of claim 9, wherein the main detector module further includes:

an antenna of less than approximately 9 inches in length;

means for detecting the lightning from the antenna;

a calibrated variable sense means for adjusting the detection distance of the lightning, the sense means having a range of approximately ½ to approximately 2 miles;

a dual purpose power on and lightning indicator light for determining operating status of the main detector module;

first means to interrupt AC power to the 120 VAC power line connected equipment; and second means to interrupt power to the at least one accessory module.

11. The low cost lightning protection system of claim 9, wherein the main detector module further includes:

a first stage means having a voltage sensitive broad-tuned RF amplifier with a response centered at approximately 0.5 MHz to approximately 3.5 MHz;

a second stage means connected to the first stage means, the second stage means having an AM detector with a response from approximately a hundred Hz to approximately 5 KHz;

a third stage means connected to the second stage means, the third stage means having an AC coupled amplifier with high input impedance and low output impedance;

a fourth stage means connected to the third stage means, the fourth stage means having a delayed response DC detector and trigger stage sensitive to relatively long lightning pulses;

a fifth stage means connected to the fourth stage means, the fifth stage means having an approximately 15 minute triggered one-shot timer;

a sixth stage means connected to the fifth stage means, the sixth stage means having a relay driver for the at least one accessory module and a next stage power relay;

a seventh stage means connected to the sixth stage means, the seventh stage means having an AC power control relay and AC receptacle;

an eighth stage means connected to the first, the second, the third, the fourth, the fifth, the sixth, and the seventh stage means, the eighth stage means supplying DC power with zener diode overvoltage clamping and fuse resistor over-current protection.

* * * * *